…

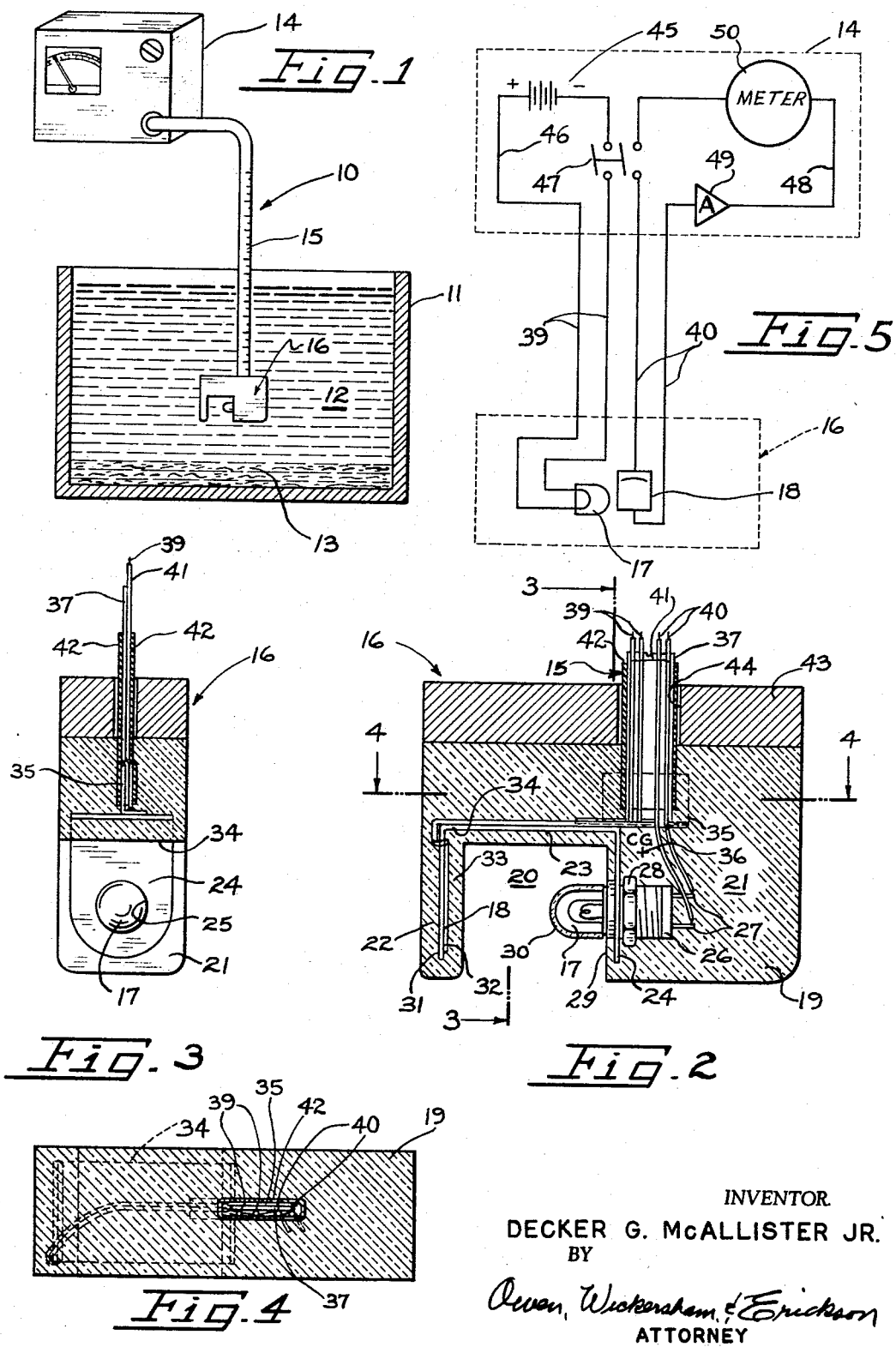

United States Patent Office 3,319,514
Patented May 16, 1967

---

3,319,514
SUBMERSIBLE TURBIDITY DETECTOR UNIT
Decker G. McAllister, Jr., 435 Green St.,
San Francisco, Calif. 94133
Filed June 13, 1962, Ser. No. 202,125
2 Claims. (Cl. 88—14)

This invention relates to a device for detecting turbidity in fluids and interfaces between fluids of differing optical properties.

Many industrial operations require an accurate and continuous or intermittent measurement of the turbidity of the liquid. For example, in many instances where fluids are stored in settling tanks and solids are accumulated at the bottom of the tanks, it is necessary to determine accurately the level of the sludge layer. Various forms of apparatus heretofore devised to measure turbidity were large and cumbersome as well as mechanically complicated and hence expensive to manufacture. Also, many such prior art turbidimeters and nephelometers required critical dimensional and/or electrical adjustments, making them difficult to operate and service. For example, most of these instruments employed complex optical systems utilizing lens systems or prisms and they thus required silica jel in the compartments containing the optical components in order to prevent moisture condensation on the light receiving surfaces that could affect the accuracy of the instrument.

Accordingly, it is a primary object of my invention to provide an improved turbidity detector for measuring sludge depths in storage tanks that has a simple but unique construction enabling it to be portable yet rugged and reliable.

Another object of the invention is to provide a turbidity detector that will be corrosion resistant to the many types of corrosion media as normally found in chemical process plants.

Still another object of my invention is to provide an improved turbidity detection instrument that can be easily carried and operated by one man and which contains its own power supply.

Another object of my invention is to provide a turbidity detector head that will assume a level position in a body of liquid when it is suspended from above by a supporting tape member.

The aforementioned and other objects of the invention are accomplished by means of a unique detector head that is connected by means of a lead assembly to an electrical power source and readout instrument. My turbidimeter is relatively small, compact and portable, and is adapted to be lowered manually into the liquid being tested. The detector head contains a light source and a photoelectric cell that are rigidly supported on a bracket member which is also fixed to the end of the lead assembly. The combined bracket assembly is encapsulated in a clear plastic body member which retains the detector head components in their proper relative positions and eliminates the need for a complicated optical system.

Other objects, advantages and features of the invention will become apparent from the following description of a preferred embodiment taken with the drawings, in which:

FIG. 1 is a diagrammatic cross section through a tank showing a turbidity detector according to the invention in its normal position when taking a measurement and connected to an electrical power source and readout instrument shown in perspective;

FIG. 2 is an enlarged view in side elevation of the detector head for the turbidimeter shown in FIG. 1 with the encapsulating body portions cut in section to show internal details;

FIG. 3 is an enlarged view in section taken along the line 3—3 of FIG. 2;

FIG. 4 is a plan view in section taken along the line 4—4 of FIG. 2;

FIG. 5 is a diagrammatic view showing the circuit arrangement that may be employed with the turbidimeter according to the invention.

Referring to the drawing, FIG. 1 illustrates diagrammatically a turbidity apparatus 10 embodying the principles of the invention as it appears in actual use within a tank 11 containing a typical turbid liquid 12 and having a layer of sludge, indicated by numeral 13, on the bottom of the tank 11. It is a purpose of the apparatus 10 to provide on a suitable readout instrument within a portable control box 14 a visual indication of an electrical value that varies in proportion to the turbidity of the liquid in the tank 11 so that the levels of turbidity or the depth of the sludge can be determined. The control box 14 is electrically connected by means of a lead assembly 15 to a small, compact detector head 16 which can be easily lowered into the tank 11 to any desired depth.

Broadly, the detector head 16 comprises a light source 17 that is located directly opposite a photo-electric cell 18. In accordance with the present invention the light source 17 and the photo cell 18 are encapsulated in an integral body member 19. The member 19 is preferably shaped so that a space 20 is formed between the light source 17 and the photo cell 18 that is open downwardly and is thus filled with the liquid or sludge in the tank 11 when the detector head 16 is lowered into it.

The details of construction of the detector head 16 will now be described with reference to FIGS. 2 and 3. The body member 19 of detector head 16 is made from a clear plastic material which has a high degree of light transmisson, is tough and durable, is chemically resistant to a wide range of materials, and is easy to form by a standard molding process. I have discovered that certain of the epoxy resin type plastics are particularly well adapted for my detector head construction according to the invention. As shown in FIGS. 2 and 3 the head 16 has a generally rectangular shape of uniform thickness and the space 20 is in the form of a slot that forms a first downwardly extending portion 21 in which is mounted the light source 17 and a second downwardly extending portion 22 in which is fixed the photo cell 18.

Imbedded within the plastic body member 19 of the detector head 16 is a U-shaped metal bracket 23 which serves as a rigid internal strengthening member and locates the photo cell and the light source in a fixed predetermined position relative to each other before they are encapsulated by the plastic body member 19. The bracket 23 comprises a first flange member 24 having a circular opening 25 which supports a standard threaded socket fitting 26 having external contact members 27. The socket fitting 26 is originally secured to the flange member 24 through the opening 25 by means of a nut portion 28. When the plastic body member 19 is formed by molding, a layer 29 of plastic is allowed to extend over the first flange member 24 and around the opening 25. The light source 17 such as a suitable bulb can thus be threadedly inserted into the embedded socket 26, and when in place, the bulb is preferably provided with a removable plastic cover 30.

On an opposite flange 31 of the bracket 23 which is substantially parallel to the flange 24 the photo cell 18 is mounted. The photo cell 18 may be of any suitable well known type comprising a photo sensitive material such as selenium in the form of a coating or layer 32 that is bonded to the flange 31. The photo cell 18 and the flange 31 are completely embedded in the second downwardly extending encapsulating body portion 22 so that a protective layer 33 of plastic of uniform thickness extends over it.

Connecting the two flanges 24 and 31 of the bracket 23 is a web portion 34. Extending beyond the first flange member 24 and connected to the web 34 is an upwardly extending flange or tab member 35. The tab member 35 functions as a central contact point for receiving the lead assembly 15 attached to the control box 14, and in accordance with the invention, it is located at or vertically in line with the center of gravity of the detector head 16 indicated by the numeral 36. This arrangement prevents any twisting of the head 16 as it is lowered into a body of liquid which could apply a strain to the lead assembly 15 and which could affect the accuracy of the measurements obtained.

The lead assembly 15 comprises a flexible steel tape 37 having visible graduation marks in fraction of feet that indicate the distances along the tape from a line extending between the light source 17 and the photo cell 18. Attached to the tape 37 are two pairs of lead wires 39 and 40 which are attached at their ends to the photo cell 18 and the light source 17 respectively. These wires are preferably spaced apart in a flattened plastic sheath 41 which is bonded flush against the tape 37. A second sheath 42 may be placed completely around the combined tape 37 and enclosed lead wires to protect the lead assembly 15 from contacting any deleterious substances during its use. The sheath 42 extends to near the end of the tape 37 and into the plastic body 19 when the detector head 16 is assembled, so that it is permanently bonded thereto. Thus, a fluid-tight, insulated connection is formed between the detector head 16 and the lead assembly 15.

Before the bracket 23 is encapsulated the end of the tape 37 is secured by some suitable means such as spot welding to the tab or flange 35. Also, the lead wires 39 are extended adjacent to but insulated from the bracket web portion 34 and are then connected with the photo cell 18. The lead wires 40 are brought downward and connected with the contacts 27 of the light source socket 26.

In order to eliminate any buoyancy effects of the detector head 16 when it is used in dense liquids a layer 43 of ballast material such as lead is attached to the top of the body portion 19. An opening 44 is provided in the layer 43 to allow the lead assembly 15 to extend straight upward from the detector head 16.

The electrical circuit for the apparatus 10 as shown in FIG. 5 is best described in relation to its operation. In the control box 14, a battery 45 or some other suitable power source is provided in a circuit 46 controlled by a switch 47 to furnish current for the light source 17. The photo-electric cell 18 is connected in series in a circuit 48 with any suitable amplifying means indicated by the numeral 49 which in turn supplies an amplified signal to a readout instrument 50 such as a microammeter. The battery 45, switch 47, amplifier 49, and readout instrument 50 are all conveniently packaged in the control box 14.

The readout instrument is calibrated to give a quantitative indication of an electrical value that is proportional to the amount of light reaching the photo-electric cell 18 from the light source 17. Thus, when the detector 16 is lowered into a body of liquid within a tank 11 and the switch 47 is closed, light from the bulb 18 passes through the liquid in the space 20 and impinges on the photo cell 17 causing an electrical signal to be generated in the circuit 48. However, when the sludge level rises to fill the space 20 in the detector head 16, essentially no light can pass to the photo cell 18, and the reading on the readout instrument 50 will indicate accordingly. When the electrical value on the readout instrument is at the zero or base level, this indicates that the sludge has been reached and the corresponding depth can be immediately read from the tape 37.

The width of the space 20 between the cover lens 30 and the photo cell 18 are dimensionally predetermined, taking into consideration the characteristics of the photo cells 18 and the light source 17, and the sensitivity of the electrical readout instrument 50. Also since the space 20 between the photo cell 18 and the cover lens 30 is open on each side of the detector head 16 there is no disturbance of the sediment as the detector head is lowered into it.

From the foregoing it should be apparent that my invention provides an improved turbidimeter that is unusually compact, rugged, and yet easy to operate with a high degree of accuracy. Moreover, its unique construction enables it to be manufactured with unusual ease and economy.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A turbidimeter for determining the sludge level in a liquid stored in a tank comprising:
   a generally U-shaped internal support member having a pair of substantially parallel spaced apart arms;
   a socket member attached to one of said arms and facing the other arm and a light bulb in said socket member;
   transparent cover means for said light bulb and said socket to seal said bulb and socket from the liquid;
   a photo-electric cell fixed to the other said arm and facing the bulb to intercept the direct rays of light from said bulb;
   an integral encapsulating body member for retaining said socket member and said photo-electric cell in a fixed predetermined spaced apart position, said body member having a relatively thin uniform layer of clear plastic over said photo-electric cell and surrounding said socket, and an open space between said light bulb and said cell;
   power means for supplying current to said light bulb;
   graduated flexible tape means attached to said internal support member and embedded in said body member for supporting said members in suspension with the photo-electric cell and light bulb in a substantially horizontal plane;
   lead wires fixed to said tape means extending from said power means to said light bulb and to said cell within said plastic body;
   and means connected to said lead wires from said cell for indicating an electrical signal that is characteristic of the turbidity of a liquid within said open space of said body member.

2. The device as described in claim 1 including a layer of lead bonded to the upper edge of said body member and providing a means for overcoming a buoyancy thereof.

References Cited by the Examiner

UNITED STATES PATENTS

| 1,167,045 | 1/1916 | Cade | 88—14 |
| 1,746,616 | 2/1930 | Sounitza | 88—14 |
| 1,958,252 | 5/1934 | Singleton et al. | 88—14 X |
| 2,183,256 | 12/1939 | Gabler | 250—239 X |
| 2,222,788 | 11/1940 | Touceda et al. | 250—239 X |
| 2,341,745 | 2/1944 | Silverman et al. | |
| 2,580,500 | 1/1952 | Albert | 88—14 |
| 2,976,763 | 3/1961 | McKeag | 88—14 |

JEWELL H. PEDERSEN, *Primary Examiner.*

T. L. HUDSON, W. A. SKLAR, *Assistant Examiners.*